(12) United States Patent
Weller

(10) Patent No.: US 6,969,023 B2
(45) Date of Patent: Nov. 29, 2005

(54) LOCKING PAWL

(75) Inventor: Hermann-Karl Weller, Alfdorf (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 12 days.

(21) Appl. No.: 10/314,062

(22) Filed: Dec. 5, 2002

(65) Prior Publication Data

US 2003/0111571 A1 Jun. 19, 2003

(30) Foreign Application Priority Data

Dec. 13, 2001 (DE) .......................... 201 20 219 U

(51) Int. Cl.[7] .......................................... B60R 22/38
(52) U.S. Cl. ................................................. 242/383.2
(58) Field of Search ........................... 242/382–384.7; 280/806; 297/478; 188/82.7, 82.74, 82.77; 74/576, 577 R, 577 S, 577 SF, 577 M

(56) References Cited

U.S. PATENT DOCUMENTS

| | | | |
|---|---|---|---|
| 3,940,082 A * | 2/1976 | Dully | 242/384.5 |
| 4,059,242 A | 11/1977 | Tanaka | |
| 4,432,507 A * | 2/1984 | Rietsch et al. | 242/383.2 |
| 4,461,434 A | 7/1984 | Butenop | |
| 4,480,802 A * | 11/1984 | Chang et al. | 74/576 |
| 4,588,140 A * | 5/1986 | Hirano | 74/576 |
| 4,597,544 A * | 7/1986 | Fohl | 242/384.6 |
| 5,303,610 A * | 4/1994 | Noel et al. | 74/577 M |

FOREIGN PATENT DOCUMENTS

| | | |
|---|---|---|
| DE | 8009960 | 8/1980 |
| DE | 3321693 A1 | 12/1984 |
| DE | 4018214 A1 | 12/1991 |
| DE | 4128775 A1 | 3/1992 |
| DE | 69101985 T2 | 5/1994 |
| DE | 69316678 T2 | 1/1998 |
| DE | 20109534 | 11/2001 |
| FR | 2476491 | 8/1981 |
| JP | 08020309 | 1/1996 |
| WO | 87/06545 | 11/1987 |

\* cited by examiner

Primary Examiner—John M. Jillions
(74) Attorney, Agent, or Firm—Tarolli, Sundheim, Covell & Tummino L.L.P.

(57) ABSTRACT

A locking pawl for a mechanism for blocking a belt retractor of a safety belt comprises a first locking pawl element made of a first material and adapted to block said belt retractor, and a second locking pawl element made of a second material and adapted to control a movement of said locking pawl. The first material is different from the second material.

9 Claims, 5 Drawing Sheets

LOCKING PAWL

TECHNICAL FIELD

This invention relates to a locking pawl for a mechanism for blocking a belt retractor of a safety belt.

BACKGROUND OF THE INVENTION

Belt retractors serve to provide a vehicle occupant with safety belt webbing. Normally, the belt webbing can be withdrawn from the belt reel against the resistance of a spring element. In the blocked condition, belt webbing cannot be withdrawn.

Disposed on such a belt retractor, as it is known for instance from German Utility Model 201 09 534, is at least one locking pawl which can be brought in engagement with locking teeth at a frame of the belt retractor, in order to non-rotatably block a belt reel. A mechanism for blocking the belt retractor allows to block the belt reel depending on the forces acting on the belt webbing or the acceleration forces acting on the vehicle. In both cases, the locking pawl is swiveled such that it engages in the locking teeth at the frame of the belt retractor. In the case of the belt-webbing-sensitive activation of the blocking mechanism, a coupling disc constituting an inertia disc, which is disposed at the belt reel so as to be rotatable relative to the same, lags behind the rotation of the belt reel due to its mass inertia. At the coupling disc, an actuating element is disposed, which effects a swivel movement of the locking pawl which thus engages in the locking teeth. The operation of such mechanism for blocking a belt retractor of a safety belt is described in detail in the above-mentioned Utility Model and will therefore not be represented in greater detail.

Although such locking pawls for belt retractors generally perform their function very well, it is desired to improve the same even more, in order to for instance reduce the production of noise or decrease the weight of the locking pawl.

BRIEF SUMMARY OF THE INVENTION

The invention provides a locking pawl for a mechanism for blocking a belt retractor of a safety belt, by means of which the production of noise is reduced distinctly. According to the invention, a locking pawl for a mechanism for blocking a belt retractor of a safety belt comprises a first locking pawl element made of a first material and adapted to block said belt retractor, and a second locking pawl element made of a second material and adapted to control a movement of said locking pawl. The first material is different from the second material. The first locking pawl element acts as load-bearing blocking element, the second locking pawl element acts as guide element. It is particularly advantageous if the first locking pawl element is made of a metal and the second locking pawl element is made of plastics. It is thus achieved that at several points there no longer occurs a metal-to-metal contact, as is usually the case, but that metal contacts plastics, which distinctly reduces the generation of noise. While the use of a locking pawl made of metal only requires a complex and expensive treatment of the metal surface, in order to achieve optimum sliding properties between the actuating element and the locking pawl, this is no longer required in the locking pawl of the invention, as the actuating element can cooperate with the second locking pawl element made of plastics. Moreover, the weight of the locking pawl is reduced distinctly.

In an advantageous embodiment of the invention, the first locking pawl element is one from the group including stamped, sintered and cold extruded parts. The same can be produced at distinctly reduced costs as compared to the locking pawls used so far.

In another advantageous embodiment of the invention, the second locking pawl element is an injection-molded plastic part which encloses the first locking pawl element. This may be effected for instance by simply attaching the second locking pawl element to the first locking pawl element by injection-molding, which provides for a particularly easy and inexpensive production of the locking pawl.

Further advantageous aspects of the invention can be taken from the sub-claims.

DETAILED DESCRIPTION OF THE PREFERRED EMBODIMENTS

Figure 1:
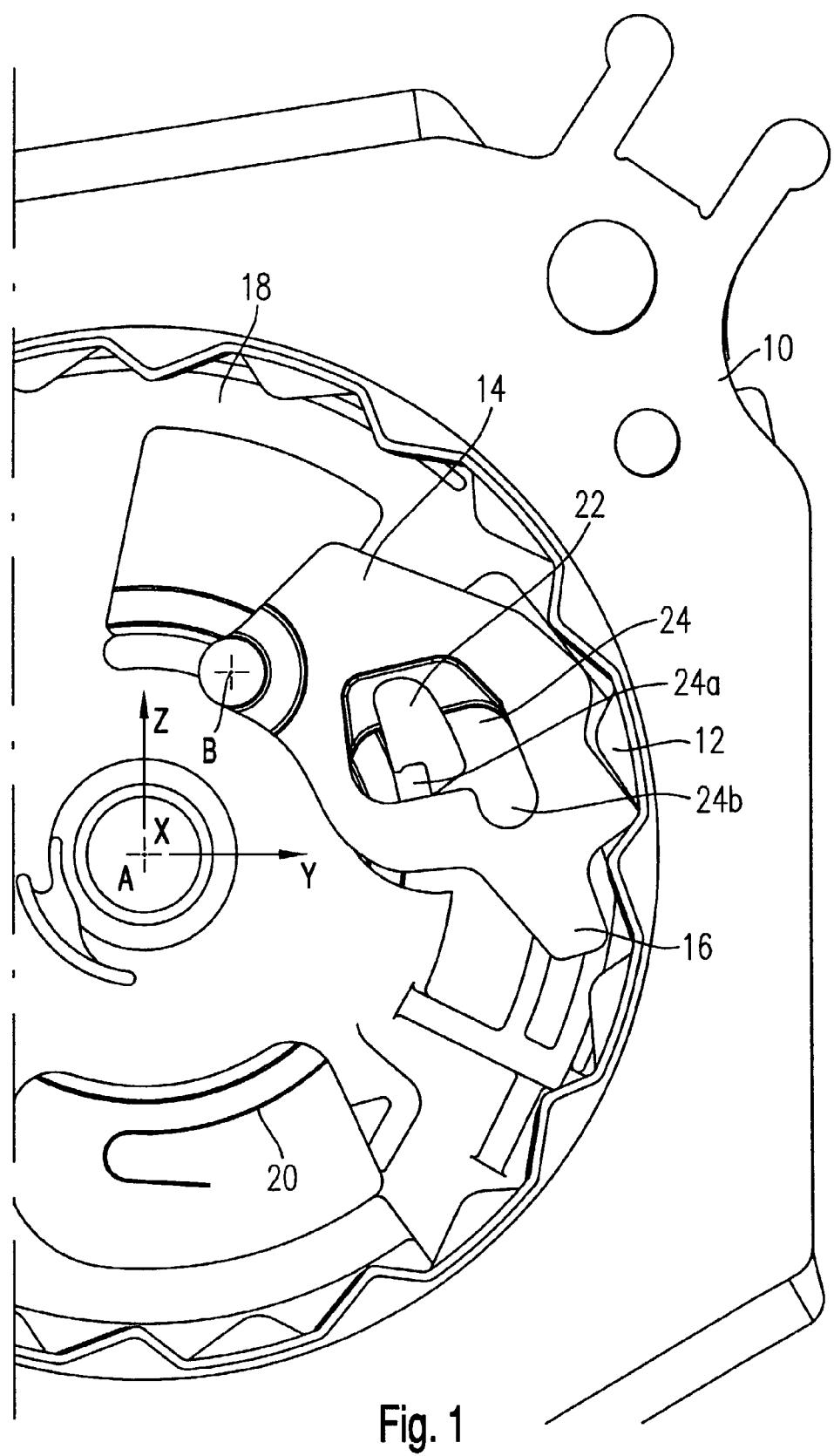
FIG. 1 shows a belt retractor comprising a mechanism for blocking a belt retractor in a partial view with cut-out portions.
Figure 2:
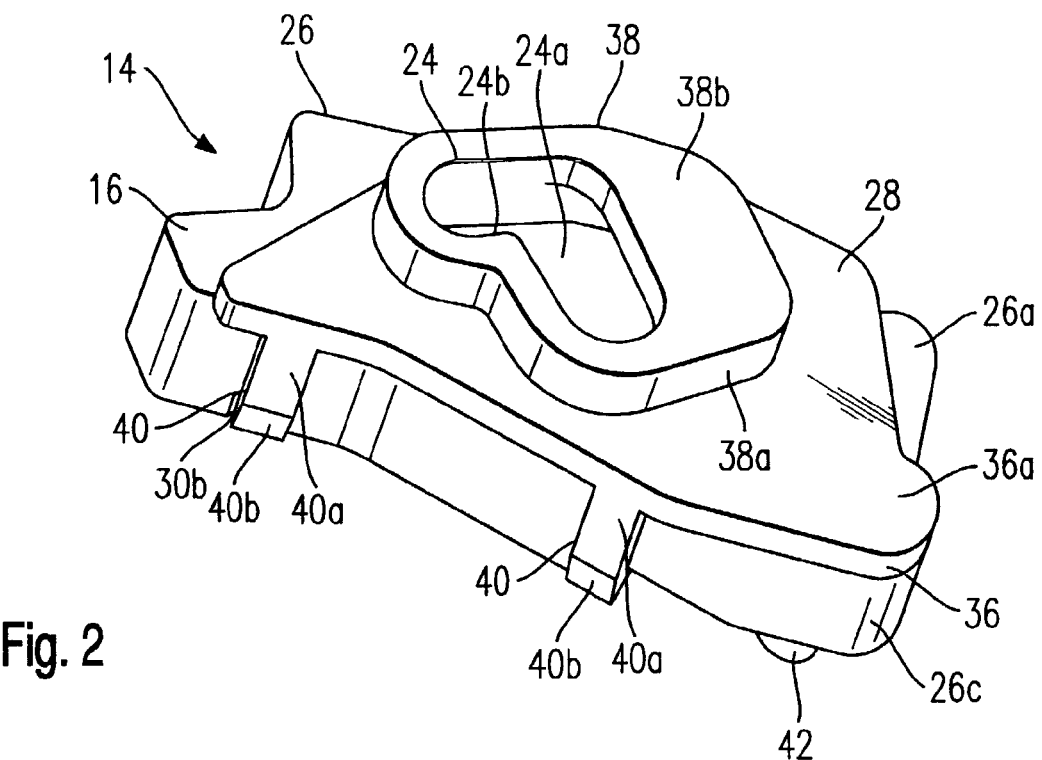
FIG. 2 shows a perspective view of a first embodiment of the locking pawl according to the invention.
Figure 4:
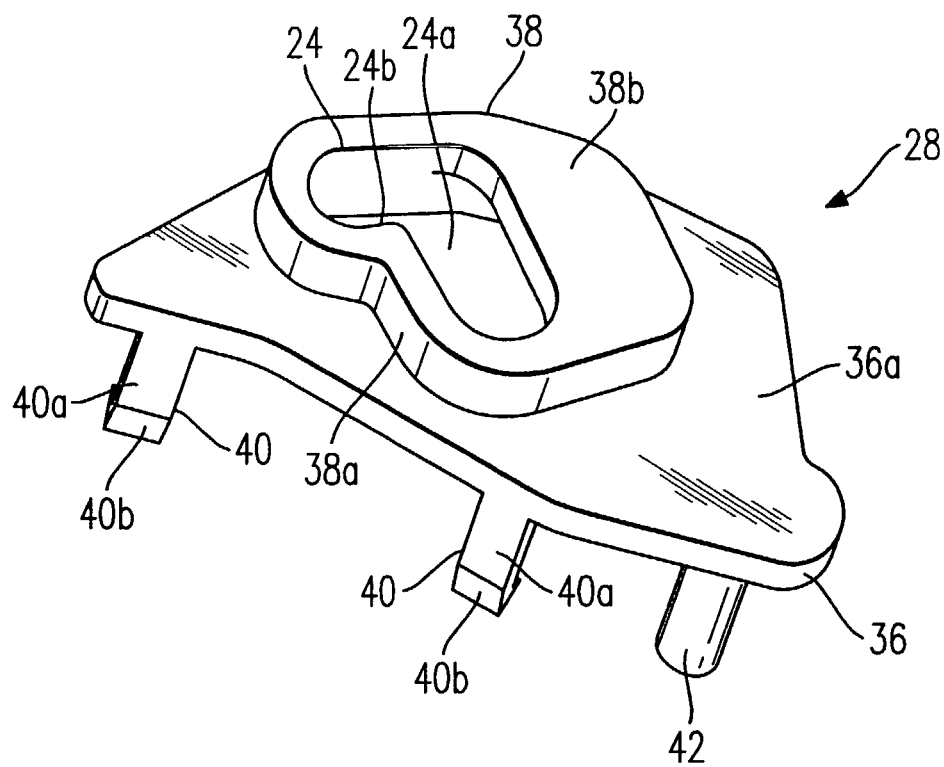
FIG. 4 shows a perspective view of the first embodiment of an element of the locking pawl according to the invention.
Figure 5:
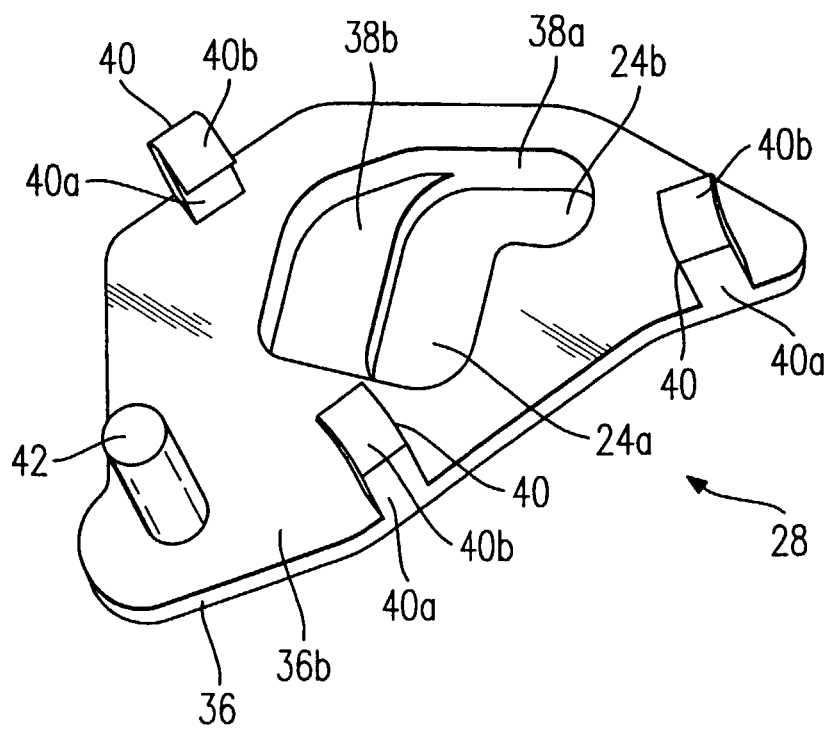
FIG. 5 shows another perspective view of the first embodiment of an element of the locking pawl according to the invention.

The belt retractor shown in FIG. 1 has a frame 10 in which a belt reel (not represented) is rotatably mounted about an axis A. In the frame 10, a circular opening is provided, at the edge of which locking teeth 12 are disposed across the entire periphery. On the belt reel, a schematically represented locking pawl 14 is pivotally mounted about an axis B. The locking pawl has a plurality of locking teeth 16 and can be brought in engagement with the locking teeth 12. A coupling disc 18 is coaxially connected with the belt reel, so that it can be rotated relative to the same to a limited extent. The basic position of the coupling disc 18 with respect to the belt reel is determined by a spiral spring 20 which biases the coupling disc. An actuating element 22 firmly connected with the coupling disc engages in a control cam 24 which is provided in the locking pawl 14 and is composed of two recesses 24a and 24b disposed substantially at right angles to each other. In FIGS. 2, 4 and 5 the control cam 24 is represented on an enlarged scale.

Figure 3:
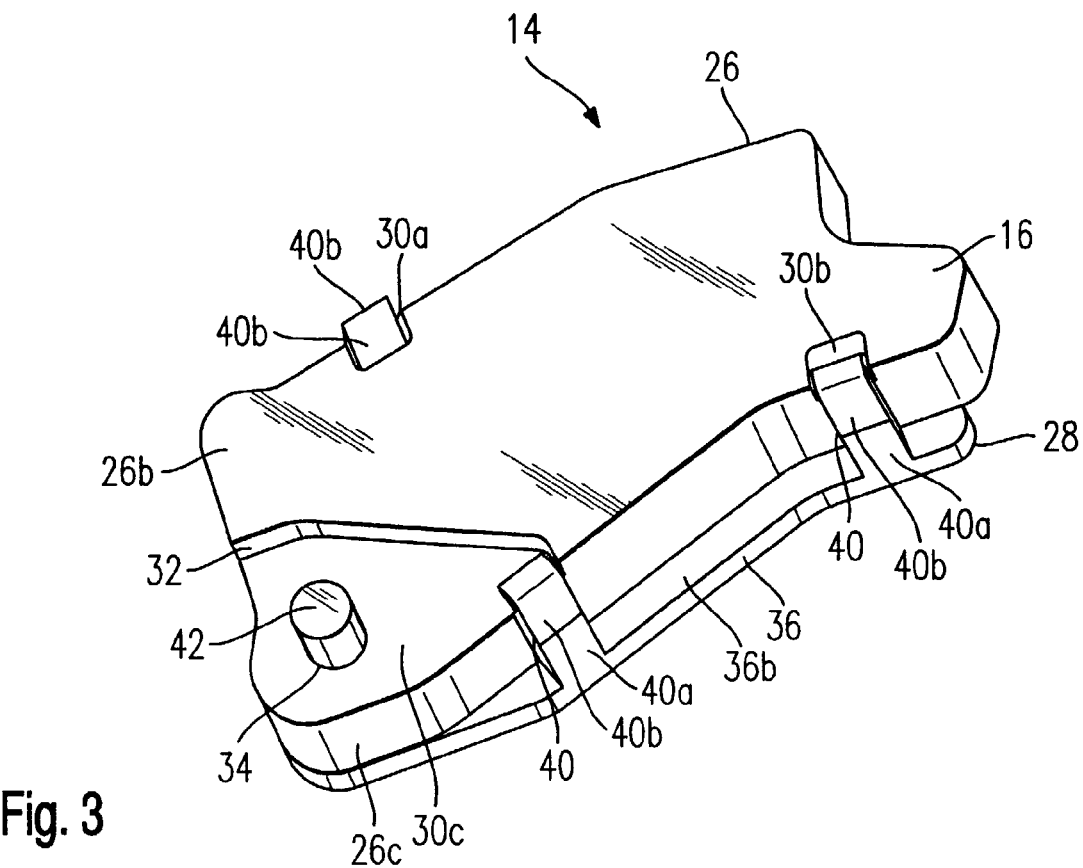
FIG. 3 shows another perspective view of the first embodiment of the locking pawl according to the invention.

In FIGS. 2 and 3, the locking pawl 14 is shown in detail. The same consists of a first locking pawl element 26 with the locking tooth 16 and a second locking pawl element 28 with the control cam 24.

The first locking pawl element 26 is made of metal and has a first and a second main surface 26a, 26b as well as an edge 26c. On the surface facing away from the second locking pawl element 28, the first locking pawl element 26 has small recesses 30a and 30b. In the entire left-hand bottom region of the first locking pawl element 26 with respect to FIG. 3, a further recess 30c extends on the side facing away from the second locking pawl element 28 and is delimited by a step 32. In the vicinity of the recess 30c, the first locking pawl element 26 has a through hole 34.

The second locking pawl element 28 is made of plastics and is composed of a base plate 36, a control cam attachment 38, three hook elements 40, and a pin 42 (see also FIGS. 4 and 5). The base plate 36 has a first limiting surface 36a and a second limiting surface 36b, the two limiting surfaces being plane-parallel with respect to each other. Above the base plate 36 with respect to FIGS. 2 and 4, the control cam attachment 38 is provided, which is composed of a wall element 38a and a ceiling element 38b, as this is shown in particular in FIGS. 2 and 4. The wall element 38a is disposed so as to be vertical to the base plate 36, the ceiling element 38b is parallel to the base plate 36. In the ceiling element 38b of the control cam attachment 38, the control cam 24 is recessed. The hook elements 40 each consist of an extension 40a, which extends substantially vertically from the base plate 36, and a nose 40b, which at the end of the extension 40a is directly connected with the same.

The first locking pawl element 26 and the second locking pawl element 28 are produced in independent working steps. The two locking pawl elements 26, 28 are then joined in a sandwich-like manner by snapping the second locking pawl element 28 onto the first locking pawl element 26. To this end, the hook elements 40 must slightly be bent to the outside with respect to the base plate 36, so that they can be pushed over the edge 26c of the first locking pawl element 26. At the same time, the pin 42 engages in the through hole 34, so that it protrudes on the side of the first locking pawl element facing away from the base plate 36. Finally, the noses 40b of the hook elements 40 snap into the corresponding recesses 30a–30c of the first locking pawl element 26. By the fourfold locking of the hook elements 40 and the pin 42 in the recesses 30 and the through hole 34, respectively, it is achieved that the second locking pawl element 28 cannot inadvertently be withdrawn from the first locking pawl element 26, and that the first locking pawl element and the second locking pawl element are secured against a lateral displacement with respect to each other. This provides for a simple, but particularly safe connection of the two locking pawl elements 26, 28.

In FIGS. 6 to 9 a second embodiment of the locking pawl is represented, in which the second locking pawl element 28 is an injection-molded plastic part which surrounds the first locking pawl element 26 made of metal.

Figure 6:
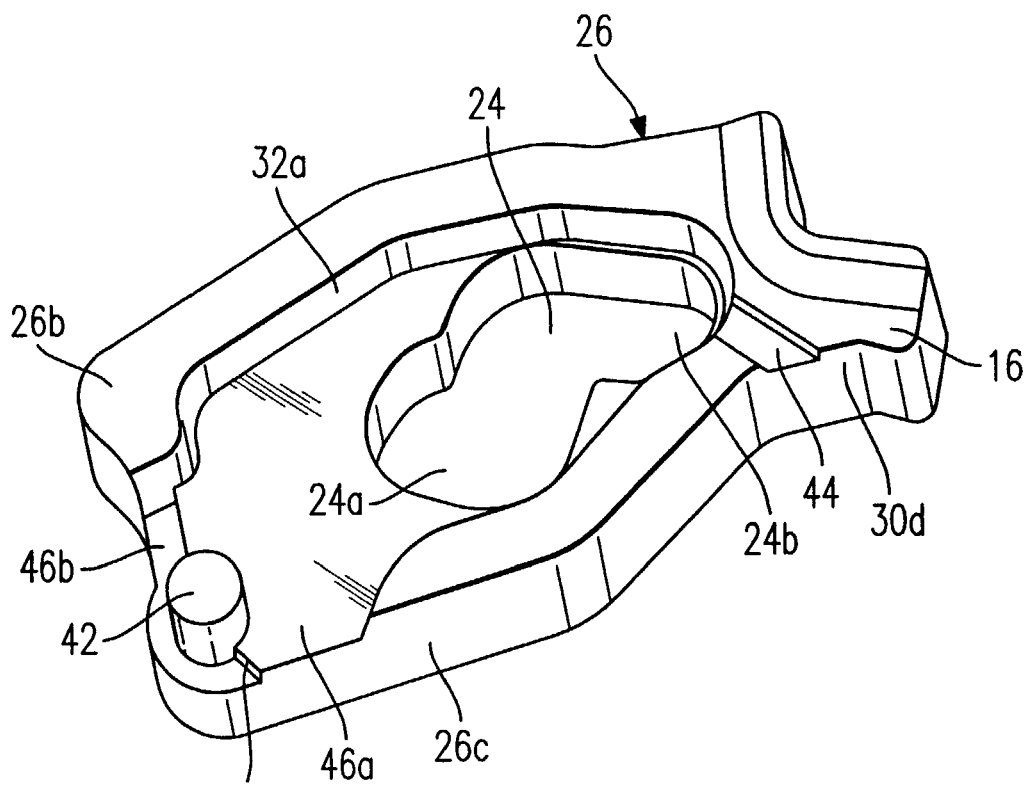
FIG. 6 shows a perspective view of a second embodiment of the locking pawl according to the invention.

FIG. 6 shows the first locking pawl element 26 with the locking tooth 16, which has the first and the second main surface 26a, 26b (see also FIG. 8) as well as the edge 26c. There is furthermore shown a groove 44 as well as a first recess surface 46a and a second recess surface 46b. The first recess surface 46a is offset with respect to the main surface 26b by a step 32a, the second recess surface 46b is offset with respect to the first recess surface by a step 32b. At the edge 26c, a recess 30d is provided in the vicinity of the groove 44. In the vicinity of the second step 32b between the two recess surfaces 46a, 46b, the first locking pawl element 26 furthermore has the pin 42. In the vicinity of the first recess surface 46a, there is provided the control cam 24 with the recesses 24a and 24b.

Figure 7:
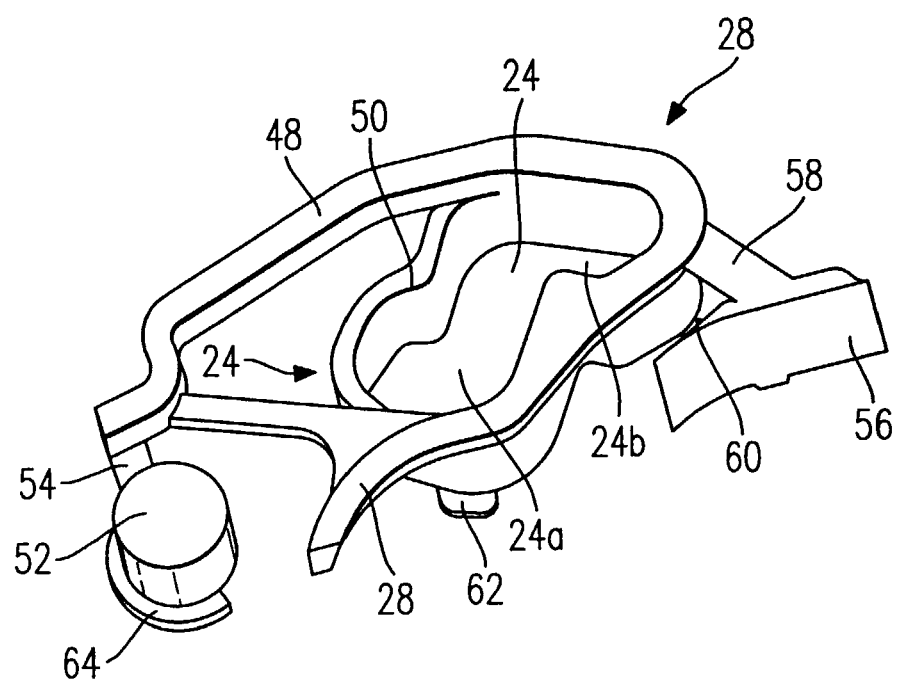
FIG. 7 shows another perspective view of the second embodiment of the locking pawl according to the invention.

FIG. 7 shows the second locking pawl element 28 made of plastics with a frame 48 to which there is attached the control cam frame 50, a pin cap 52 via a first connecting web 54 and a pawl edge portion 56 via a second connecting web 58 and a third connecting web 60. On the main surface side facing away from the observer, the pin cap 52 is open. As can be better seen in FIG. 8, two pins 62 are disposed on the side of the control cam frame 50 facing away from the frame 48. At its open end, the pin cap 52 furthermore is provided with a web 64 in the form of a semicircular arc, starting at the first connecting web 54.

Figure 8:
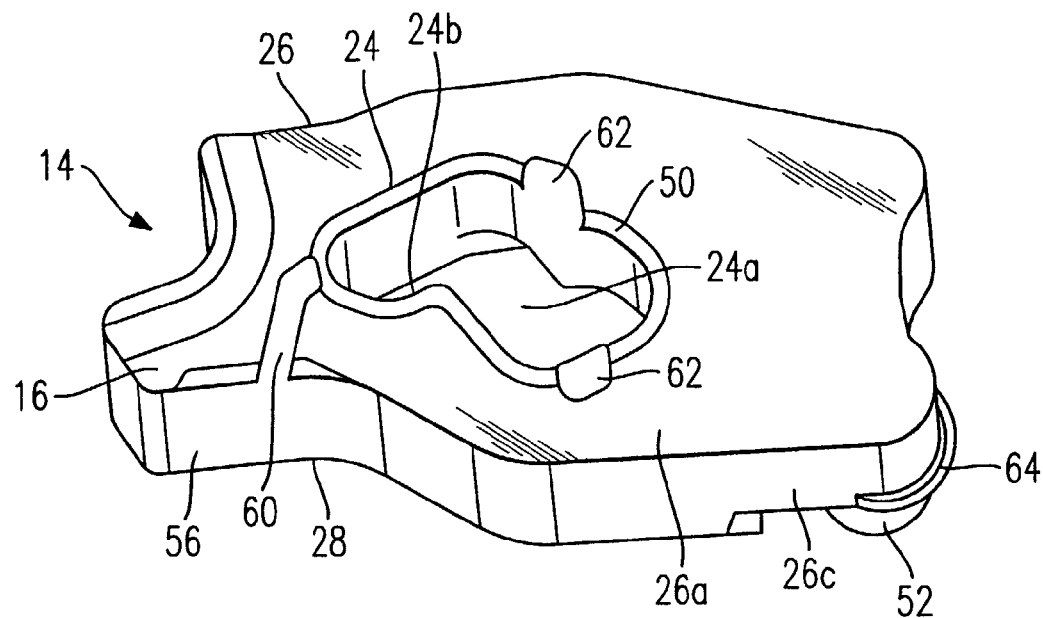
FIG. 8 shows a perspective view of the second embodiment of an element of the locking pawl according to the invention.
Figure 9:
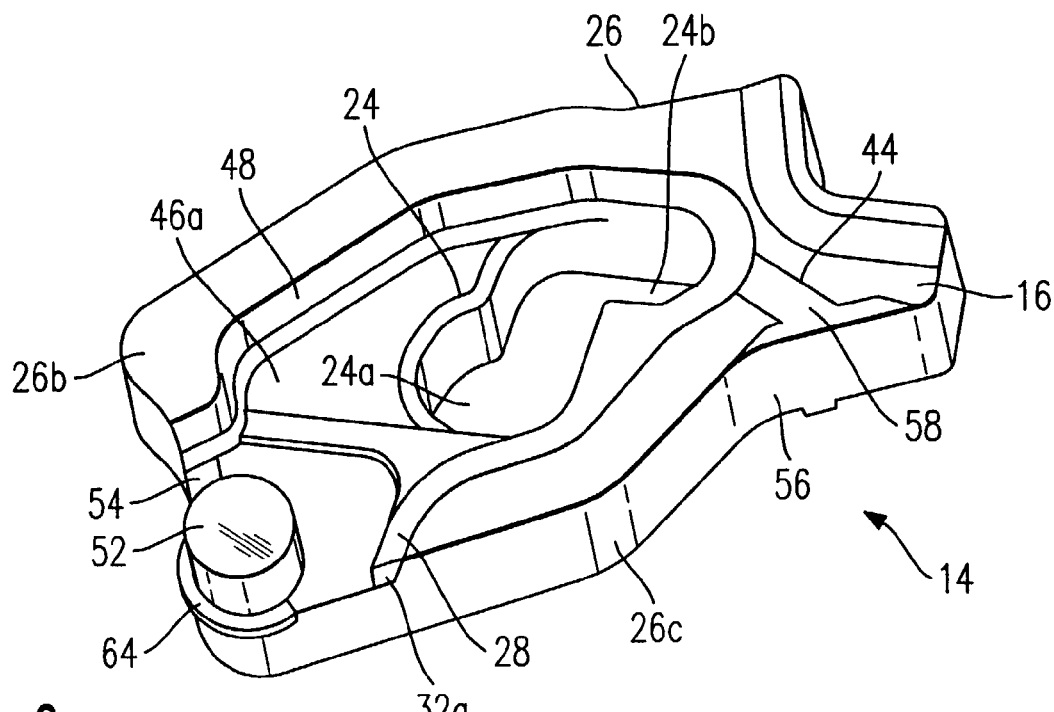
FIG. 9 shows a perspective view of the second embodiment of another element of the locking pawl according to the invention.

FIGS. 8 and 9 show the locking pawl 14 with the first locking pawl element 26 and the second locking pawl element 28. The second locking pawl element 28 is made such that it precisely fits together with the first locking pawl element 26. Thus, the control cam frame 50 of the second locking pawl element 28 lies in the control cam 24 of the first locking pawl element 26 with the recesses 24a and 24b. The frame 48 of the second locking pawl element 28 is adapted to the profile of the step 32a of the first locking pawl element 26 and has a snug fit with the same. The pin cap 52 of the second locking pawl element 28 is adapted to the shape of the pin 42 of the first locking pawl element 26, so that the pin is seated in the pin cap in a form-fitting manner. The second recess surface 46b of the first locking pawl element 26 accommodates the first connecting web 54 and the web 64, whereas the groove 44 accommodates the second connecting web 58. The pawl edge portion 56 of the second locking pawl element 28 lies in the recess 30d of the first locking pawl element 26 in a form-fitting manner.

In the following, the production of the locking pawl will briefly be described. Upon producing the first locking pawl element 26, the second locking pawl element is attached to the first locking pawl element by injection-molding. The connection between the first locking pawl element 26 and the second locking pawl element 28 is primarily effected by the annular connection of control cam frame 50, third connecting web 60, pawl edge portion 56 and second connecting web 58, which in turn is connected with the frame 48. To prevent that the control cam frame 50 can at least partly be withdrawn from the control cam 24, the pins 62 are made such that they reach over the first locking pawl element 26 on the first main surface 26a (see FIG. 8). The frame 48 and the pin cap 52 furthermore prevent an at least partial lateral displacement of parts of the second locking pawl element with respect to the first locking pawl element. By means of few and simple measures there is thus achieved a good form-fitting connection between the first and second locking pawl elements.

What is claimed is:

1. A locking pawl for a mechanism for blocking a belt retractor of a safety belt, the improvement consisting in that said locking pawl comprises a first locking pawl element made of a first material and adapted to block said belt retractor, and a second locking pawl element made of a second material and adapted to control a movement of said locking pawl, said first material is different from said second material, said first locking pawl element having a first main surface to which said second locking pawl element is attached, said second locking pawl element having a control cam, said control cam having a recess formed in a surface facing away from said first main surface of said first locking pawl element, said recess being engageable by an actuating element of the belt retractor.

2. The locking pawl as claimed in claim 1, wherein said first locking pawl element is made or metal and said second locking pawl element is made of plastics.

3. The locking pawl as claimed in claim 1, wherein said first locking pawl element is one from the group including stamped, sintered and cold extruded parts.

4. The locking pawl as claimed in claim 1, wherein said first and second locking pawl elements are joined in a sandwich-like manner.

5. The locking pawl as claimed in claim 4, wherein said first locking pawl element has recesses and said second locking pawl element has hook elements which engage in said recesses, in order to provide for a connection between said first locking pawl element and said second locking pawl element.

6. The locking pawl as claimed in claim 4, wherein said first locking pawl element has a through hole and said second locking pawl element has a which engages in said through hole, in order to provide for securing a connection between said first locking pawl element and said second locking pawl element against a lateral displacement.

7. The locking pawl as claimed in claim 1, wherein said second locking pawl element is an injection-molded plastic part which surrounds said first locking pawl element.

8. A locking pawl for a mechanism for blocking a belt retractor of a safety belt, the improvement consisting in that said locking pawl comprises a first locking pawl element made of a first material and adapted to block said belt retractor, and a second locking pawl element made of a second material and adapted to control a movement of said locking pawl, wherein said first material is different from said second material, said second locking pawl element having a control cam, said control cam being composed of two recesses disposed substantially at right angles to each other.

9. A locking pawl for a mechanism for blocking a belt retractor of a safety belt, the improvement consisting in that said locking pawl comprises a first locking pawl element made of a first material and adapted to block said belt retractor, and a second locking pawl element made of a second material and adapted to control a movement of said locking pawl, said first material being different from said second material, said second locking pawl element having a first main surface abutting said first locking pawl element and a second main surface opposite said first main surface, said second main surface of said second locking pawl element having a control cam with a recess engageable by an actuating element of the belt retractor.

* * * * *